(12) United States Patent
Miller et al.

(10) Patent No.: US 12,163,419 B2
(45) Date of Patent: Dec. 10, 2024

(54) FLEX WORD TELEMETRY SEQUENCING

(71) Applicant: ERDOS MILLER, INC., Houston, TX (US)

(72) Inventors: Kenneth Miller, Houston, TX (US);
David Erdos, Houston, TX (US);
Abraham Erdos, Houston, TX (US)

(73) Assignee: ERDOS MILLER, INC., Houston, TX (US)

( * ) Notice: Subject to any disclaimer, the term of this patent is extended or adjusted under 35 U.S.C. 154(b) by 7 days.

(21) Appl. No.: 18/206,956

(22) Filed: Jun. 7, 2023

(65) Prior Publication Data

US 2023/0399945 A1     Dec. 14, 2023

Related U.S. Application Data

(60) Provisional application No. 63/351,003, filed on Jun. 10, 2022.

(51) Int. Cl.
| | |
|---|---|
| *E21B 47/14* | (2006.01) |
| *E21B 47/12* | (2012.01) |
| *G06F 7/10* | (2006.01) |

(52) U.S. Cl.
CPC ............... *E21B 47/14* (2013.01); *G06F 7/10* (2013.01); *E21B 47/12* (2013.01)

(58) Field of Classification Search
CPC ........ E21B 47/12; E21B 47/125; E21B 47/13; E21B 47/135; E21B 47/14; E21B 47/16; E21B 47/18; E21B 47/20; E21B 47/22; E21B 47/24; G06F 7/10
See application file for complete search history.

(56) References Cited

U.S. PATENT DOCUMENTS

| | | | |
|---|---|---|---|
| 9,458,711 B2 * | 10/2016 | van Zelm | E21B 17/003 |
| 11,356,826 B2 * | 6/2022 | Hall | H04W 12/033 |
| 11,828,155 B2 * | 11/2023 | Yu | E21B 47/12 |

* cited by examiner

*Primary Examiner* — Franklin D Balseca
(74) *Attorney, Agent, or Firm* — Dickinson Wright PLLC (57) ABSTRACT

In one embodiment, a computer-implemented method is disclosed. The method includes operating a downhole tool by transmitting first data to one or more surface processors in a telemetry sequence. The first data may include a flex word having a first identifier identifying a first payload, and the first data is transmitted using a synchronized time sequence. The method includes detecting, by the downhole tool, an operating condition that occurs while the downhole tool is downhole. Based on the operating condition, the method includes dynamically changing the flex word to comprise a second identifier identifying a second payload transmitted in second data in the telemetry sequence to the one or more surface processors, and the second data is transmitted in the telemetry sequence using the synchronized time sequence.

20 Claims, 8 Drawing Sheets

FLEX WORD TELEMETRY SEQUENCING

CROSS-REFERENCES TO RELATED APPLICATIONS

This application claims priority to U.S. Application Patent Serial No. 63/351,003 filed Jun. 10, 2022, titled "FLEX WORD TELEMETRY SEQUENCING," the entire disclosure of which is hereby incorporated by reference for all purposes.

TECHNICAL FIELD

This disclosure relates generally to measurement-while-drilling (MWD) data and, in particular, to flex word telemetry sequencing for MWD data.

BACKGROUND

One problem encountered with MWD data is that downhole conditions may change dynamically and different data may be desired to continue to operate the downhole tool properly. For example, a downhole tool may change from rotating to sliding or vice versa. In such a scenario, different data may need to be transmitted from an MWD tool to a surface processor. During rotating, the MWD tool may transmit information pertaining to Gamma, while during sliding the MWD tool may transmit information related to the tool face. Conventional systems have preset payloads that are transmitted for each mode of operating the downhole tool, and the systems resynchronize each time operating modes change and different data is transmitted.

SUMMARY

In one embodiment, a computer-implemented method is disclosed. The method includes operating a downhole tool by transmitting first data to a surface processor in a telemetry sequence. The first data may include a flex word having a first identifier identifying a first payload, and the first data is transmitted using a synchronized time sequence. The method includes detecting, by the downhole tool, an operating condition that occurs while the downhole tool is downhole. Based on the operating condition, the method includes dynamically changing the flex word to comprise a second identifier identifying a second payload transmitted in second data in the telemetry sequence to the surface processor, and the second data is transmitted in the telemetry sequence using the synchronized time sequence.

In some embodiments, a system is disclosed. The system may include a tool drill string having a downhole device. The system may include a memory device storing instructions and a downhole processor communicatively coupled to the memory device. The downhole processor executes the instructions to operate the downhole device by transmitting first data to a surface processor in a telemetry sequence, wherein the first data includes a flex word having a first identifier identifying a first payload, and the first data is transmitted using a synchronized time sequence. The downhole processor may detect, by the downhole device, an operating condition that occurs while the downhole tool is downhole, and based on the operating condition, the downhole processor may dynamically change the flex word to comprise a second identifier identifying a second payload transmitted in second data in the telemetry sequence to the surface processor, and the second data is transmitted in the telemetry sequence using the synchronized time sequence.

In one embodiment, a tangible, non-transitory computer-readable medium stores instructions that, when executed, cause a processing device to operate a downhole device by transmitting first data to a surface processor in a telemetry sequence, wherein the first data includes a flex word having a first identifier identifying a first payload, and the first data is transmitted using a synchronized time sequence. The processing device may detect, by the downhole device, an operating condition that occurs while the downhole tool is downhole, and based on the operating condition, the processing device may dynamically change the flex word to comprise a second identifier identifying a second payload transmitted in second data in the telemetry sequence to the surface processor, and the second data is transmitted in the telemetry sequence using the synchronized time sequence.

Other technical features may be readily apparent to one skilled in the art from the following figures, descriptions, and claims. These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and in the claims, the singular form of 'a', 'an', and 'the' include plural referents unless the context clearly dictates otherwise.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The terminology used herein is for the purpose of describing particular example embodiments only, and is not intended to be limiting. As used herein, the singular forms "a," "an," and "the" may be intended to include the plural forms as well, unless the context clearly indicates otherwise. The terms "a," "an," "the," and "said" as used herein in connection with any type of processing component configured to perform various functions may refer to one processing component configured to perform each and every function, or a plurality of processing components collectively configured to perform each of the various functions. By way of example, "A processor" configured to perform actions A, B, and C may refer to one processor configured to perform actions A, B, and C. In addition, "A processor" configured to perform actions A, B, and C may also refer to a first processor configured to perform actions A and B, and a second processor configured to perform action C. Further, "A processor" configured to perform actions A, B, and C may also refer to a first processor configured to perform action A, a second processor configured to perform action B, and a third processor configured to perform action C. The method steps, processes, and operations described herein are not to be construed as necessarily requiring their performance in the particular order discussed or illustrated, unless specifically identified as an order of performance. It is also to be understood that additional or alternative steps may be employed.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure are by way of illustration only and should not be construed in any way to limit the scope of the disclosure.

In some embodiments, one or more flex words may be used in a payload to dynamically send data to a surface processor based on events or conditions occurring downhole. Conventionally, the exact data to be sent to the surface processor was pre-programmed into the downhole measurement-while-drilling (MWD) tool and the surface processor prior to the operating the MWD tool and/or tool drill string.

A flex word may refer to an M-Ary data word that has dynamically variable payloads, where the payload is identified by a flex word identifier (FID). Flex words may enable the MWD tool to prioritize certain data or measurements based on events or downhole conditions. For example, if shock and vibration levels are normal (e.g., within a target range of values), the MWD tool may send more formation related measurements (e.g., gamma radiation levels, azimuthal gamma image data, resistivity data, etc.). However, if the shock and vibration levels become unsafe (e.g., exceed a threshold value and/or are outside of a target range of values), the MWD tool may begin transmitting shock and vibration warnings and dynamics measurements (e.g., axial/lateral vibration measurements, axial/lateral shock measurements, differential RPM). In some embodiments, the MWD tool is configured to alternate between shock and vibration levels and formation related measurements so as not to stop all formation related measurements. In other words, the MWD tool may send shock and vibration level measurements, and next time send gamma measurements, and then shock and vibration level measurements, and then gamma measurements, etc. This may enable a drill operator to be made aware of the drilling dysfunction causing high shock and vibration sooner than they could otherwise tell if the shock and vibration measurements were not pre-programmed to be sent frequently to surface.

If the shock and vibration level measurements are low (e.g., all indicators are green and/or the measurements are below a threshold value), for example, and the MWD tool sends gamma to the surface processor, the surface processor may also update the shock and vibration levels showing that they are still all green, thus getting two measurements updated simultaneously. That is, the surface processor may receive first data having a first type of measurement and update a data field for second data having a second measurement type implicitly based on the values of the first data. This mode of operation may provide the surface processor additional information simply based on which measurements the MWD tool determines to transmit, and by deciding to transmit one set of measurements over the other, the surface processor may update the unsent measurements in some cases, as well.

This same concept can be applied to toolface as well, if the toolface is holding steady at 0° and the MWD tool transmits a continuous inclination measurement, the surface processor may update the continuous inclination measurement and the toolface measurement, indicating that it's still 0°. This technique may be performed because the surface processor determines that the MWD tool would only send a continuous inclination measurement in that flex word if the toolface measurement was still 0°.

Additionally, flex words can be used to switch between information needed during sliding or rotation. For example, during sliding, the MWD tool is not rotating, and the drill operator may desire to know the toolface angle (TFA), so when the MWD tool detects that there is no rotation, the MWD tool may populate flex word payloads with TFA, but when rotation starts, the MWD tool may switch to populating those same flex words in the telemetry with gamma measurements. The flex words identifier may be updated to indicate the type of data being transmitted in the following payload.

The disclosed embodiments may eliminate the need to resynchronize, which is currently required in conventional systems to switch between rotating and sliding telemetry sequences. Re-synchronization takes significant time, and is risky to do while drilling, and this use of flex words may provide an elegant technical solution.

The same concept can be applied to status words. If all MWD tool statuses are normal, then the MWD tool may transmit a typical measurement, for example, gamma or continuous inclination/azimuth, but if there is a tool error then instead, the MWD tool may transmit a status word in that same slot to inform the drill operator of the issue.

A "word" may refer to a certain number of bits of data that may be encoded and transmitted in a payload during a telemetry sequence. Values may be encoded using an M-Ary encoding scheme and may be transmitted to processing devices for decoding to determine the values at the processing devices.

Figure 1:
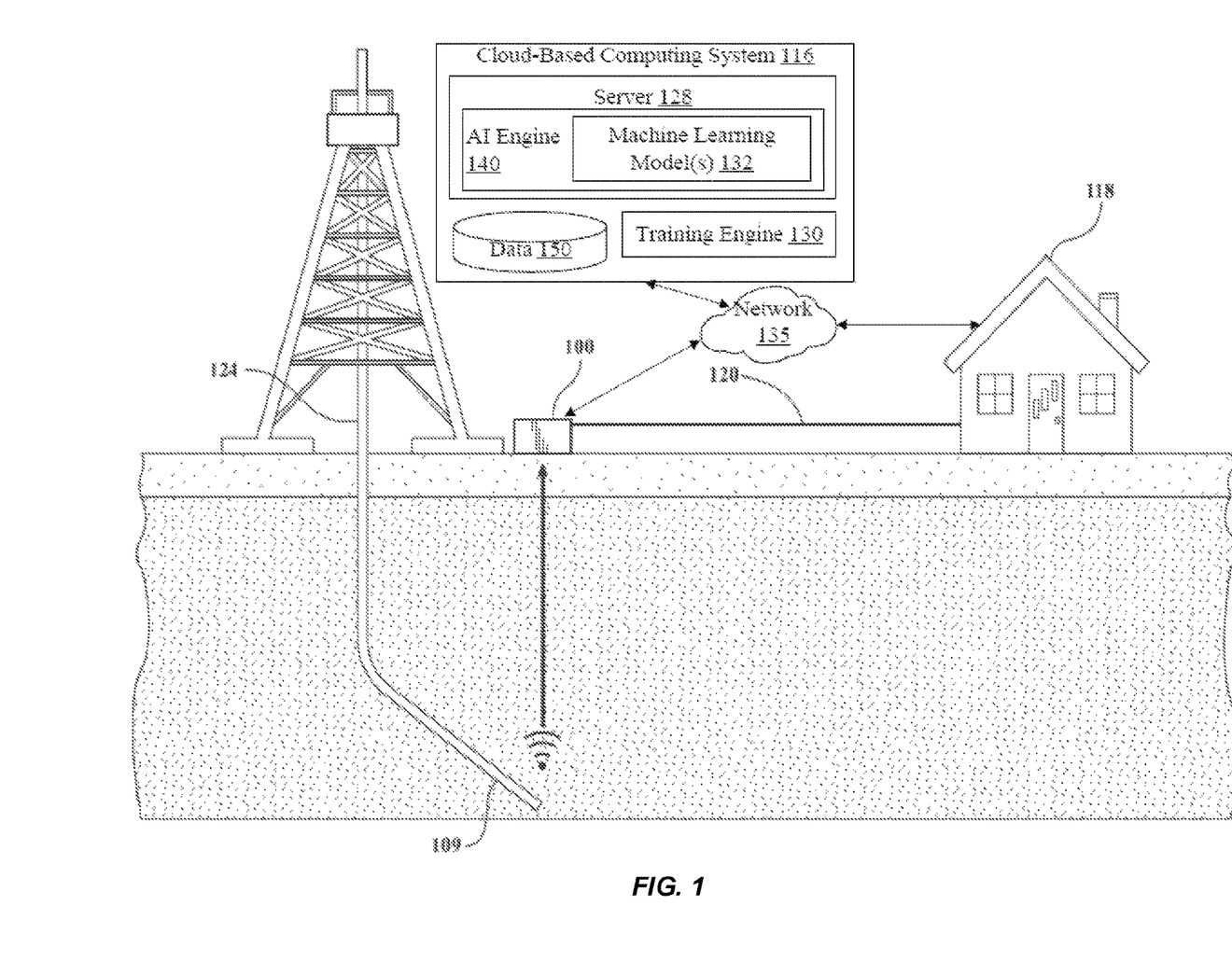
FIG. 1 is an illustration of a MWD system in a well sending data to a MWD data acquisition system, according to embodiments of the disclosure.

FIG. 1 shows the MWD data acquisition system 100 as placed next to an oil rig. The MWD data acquisition system 100 includes at least one data reception device. In some embodiments, there may be more than one data reception device. The data reception device may include various components, such as an analog data reception circuit configured to receive analog MWD data from an MWD tool 109, an analog-to-digital conversion circuit configured to convert the analog MWD data to digital MWD data, a data transmission circuit configured to transmit analog and/or digital data to a surface computing device 118. In some embodiments, the surface computing device 118 may be local or remote from the MWD data acquisition system 100. For example, the MWD data acquisition system 100 may be locally communicatively connected, via a cable 120, to the surface computing device 118 or the MWD data acquisition system 100 may be remotely communicatively coupled, via a network 135, to the surface computing device 118. In some embodiments, the MWD data acquisition system 100 may be included as a component of the surface computing device 118. In some embodiments, the MWD data acquisition system 100 may include or be coupled to a component (e.g., pressure transducer) configured to receive the data sent from the MWD tool 109. In some embodiments, the MWD data acquisition system 100 is configured to transmit digital data to a surface computing device 118 via the cable 120 using, for example, one of the following cable and communication standards: RS-232, RS-422, RS-485, Ethernet, USB, or CAN bus. Network 135 may be a public network (e.g., connected to the Internet via wired (Ethernet) or wireless (WiFi)), a private network (e.g., a local area network (LAN) or wide area network (WAN)), or a combination thereof. Network 135 may also comprise a node or nodes on the Internet of Things (IoT).

The MWD tool 109 may be programmed with information such as which measurements to take and which data to transmit back to the surface. The MWD tool 109 may include a downhole processor (e.g., telemetry controller). Communicating data between the downhole processor (e.g., telemetry controller) and a surface processor (e.g., included in the surface computing device 118) may be performed using various types of telemetry. For example, mud pulse (MP) telemetry and/or electromagnetic (EM) telemetry. The downhole processor and surface processor may perform a synchronization process where transmission of data is time synchronized for a telemetry sequence. In some embodiments, even when conditions change downhole (e.g., vibration is detected higher than a threshold) and the downhole tool changes from rotating to sliding or vice versa, resynchronization may not be performed because of the use of flex words.

In some embodiments, a cloud-based computing system 116 may be communicatively coupled, via the network 135, to the surface computing device 118 and/or the MWD data acquisition system 100. Each of the components included in the cloud-based computing system 116, the surface computing device 118, and/or the MWD data acquisition system 100 may include one or more processing devices, memory devices, and/or network interface cards. The network interface cards may enable communication via a wireless protocol for transmitting data over short distances, such as Bluetooth, ZigBee, NFC, etc. Additionally, the network interface cards may enable communicating data over long distances.

The surface computing device 118 may be any suitable computing device, such as a laptop, tablet, smartphone, or computer. The surface computing device 118 may include a display capable of presenting a user interface of an application. The application may be implemented in computer instructions stored on the one or more memory devices of the surface computing device 118 and executable by the one or more processing devices of the surface computing device 118. The application may present various user interfaces that present various configuration options to configure one or more settings and present various measurements received from the MWD tool 109 without resynchronization occurring when the tool drill string changes from rotating to sliding or vice versa, or other conditions downhole change. Any modification to the one or more settings may cause a downlink message to be transmitted from the surface processor to the telemetry controller during various modes of operating (e.g., off bottom where the tool drill string is not contacting the formation and on bottom where the drill string is drilling ahead and in contact with the formation). The surface computing device 118 may also include instructions stored on the one or more memory devices that, when executed by the one or more processing devices of the surface computing device 118, perform operations of any of the methods described herein.

In some embodiments, the cloud-based computing system 116 may include one or more servers 128 that form a distributed computing architecture. The servers 128 may be a rackmount server, a router computer, a personal computer, a portable digital assistant, a mobile phone, a laptop computer, a tablet computer, a camera, a video camera, a netbook, a desktop computer, a media center, any other device capable of functioning as a server, or any combination of the above. Each of the servers 128 may include one or more processing devices, memory devices, data storage, and/or network interface cards. The servers 128 may be in communication with one another via any suitable communication protocol. The servers 128 may execute an artificial intelligence (AI) engine 140 that uses one or more machine learning models 132 to perform one or more of the embodiments disclosed herein. The cloud-based computing system 128 may also include a database 150 that stores data, knowledge, and data structures used to perform various embodiments. For example, the database 150 may store a corpus of settings (e.g., information pertaining to flex words identifiers, payload measurement type for each flex word, number of bits for a flex word and its payload, etc.) and various parameters (e.g., condition of the tool drill string, condition of the formation, condition of the weather, condition of a telemetry channel, etc.), and results that indicate which settings provided desired outcomes for which parameters. A condition of the weather may include "rain", "sunny", "cloudy", etc. The data stored in the database 150 may represent training data, in some embodiments. The training data may be used to train the machine learning models 132.

In some embodiments the cloud-based computing system 116 may include a training engine 130 capable of generating the one or more machine learning models 132. The machine learning models 132 may be trained to receive parameters related to various conditions (e.g., of the downhole device, of the telemetry channel, of the well in which the downhole device is disposed, of the weather, of another system, etc.), identify which setting (e.g., pulse overdrive percentages, survey baud rates, sliding baud rates, high-resolution M-Ary encoding enable/disable setting, etc.) provides a desired outcome for the parameters, output the identified settings, generate a request including the identified settings, and/or transmit the overdrive request to the telemetry controller to implement the identified settings. In some embodiments, the machine learning models 132 may be trained to determine a probability of transmission success for a certain type of telemetry based on the parameters of the well and/or tool drill string.

The training engine 130 may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine 130 may be cloud-based, be a real-time software platform, include privacy software or protocols, and/or include security software or protocols.

To generate the one or more machine learning models 132, the training engine 130 may train the one or more machine learning models 132. The training engine 130 may use a base training dataset of settings (e.g., pulse overdrive percentages, survey baud rates, sliding baud rates, high-resolution M-Ary encoding enable/disable setting, etc.) and parameters (e.g., condition of the tool drill string, condition of the formation, condition of the weather, condition of a telemetry channel, etc.) and labels that classify any suitable combination of the settings for any suitable combination of the parameters as providing desired outcome (e.g., higher data rate, higher amount of data included in a data packet, etc.).

The one or more machine learning models 132 may refer to model artifacts created by the training engine 130 using training data that includes training inputs and corresponding target outputs. The training engine 130 may find patterns in the training data wherein such patterns map the training input to the target output and generate the machine learning models 132 that capture these patterns. Although depicted separately from the server 128, in some embodiments, the training engine 130 may reside on server 128. Further, in some embodiments, the artificial intelligence engine 140, the database 150, and/or the training engine 130 may reside on the computing device 102.

As described in more detail below, the one or more machine learning models 132 may comprise, e.g., a single level of linear or non-linear operations (e.g., a support vector machine (SVM)) or the machine learning models 132 may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons. In some embodiments, one or more of the machine learning models 132 may be long short-term memory (LSTM), which is an artificial recurrent neural network architecture that uses feedback connections. It can not only process single data points, but also entire sequences of data (e.g., a signal of MWD telemetry data).

Figure 2:
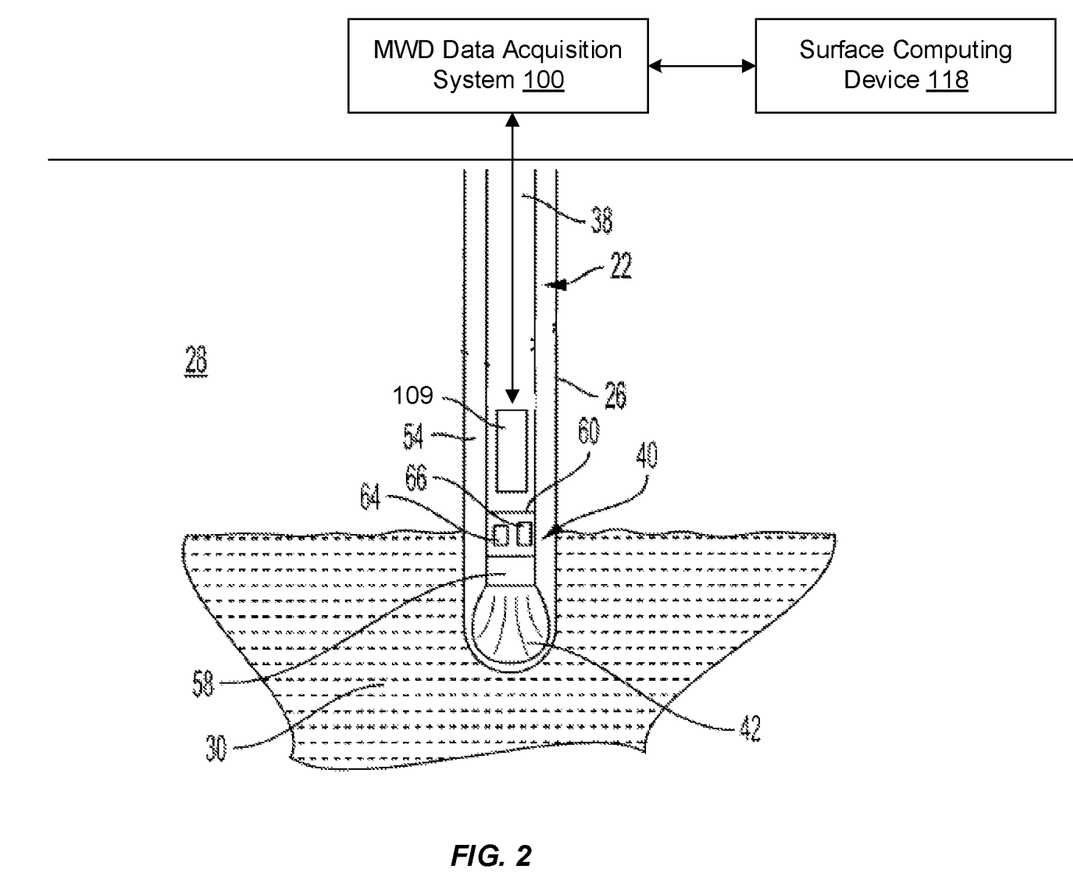
FIG. 2 is a block diagram of a tool drill string, according to embodiments of the disclosure.

FIG. 2 is a block diagram of a tool drill string 22, according to embodiments of the disclosure. The system 10 includes the borehole drill string 22 and a rig for drilling a well borehole 26 through earth 28 and into a formation 30. After the well borehole 26 has been drilled, fluids such as water, oil, and gas can be extracted from the formation 30. In some embodiments, the rig 24 is situated on a platform that is on or above water for drilling into the ocean floor.

In one example, the rig (not depicted) includes a derrick, a derrick floor, a rotary table, and the drill string 22. The drill string 22 includes a drill pipe 38 and a drilling assembly 40 attached to the distal end of the drill pipe 38 at the distal end of the drill string 22.

The drilling assembly 40 includes a drill bit 42 at the bottom of the drilling assembly 40 for drilling the well borehole 26.

A fluidic medium, such as drilling mud 44, is used by the system for drilling the well borehole 26. The fluidic medium circulates through the drill string 22 and back to the fluidic medium source, which is usually at the surface 201. In embodiments, drilling mud is drawn from a mud pit and circulated by a mud pump through a mud supply line and into a swivel. The drilling mud flows down through an axial central bore in the drill string 22 and through jets (not shown) in the lower face of the drill bit 42. Borehole fluid 54, which contains drilling mud, formation cuttings, and formation fluid, flows back up through the annular space between the outer surface of the drill string 22 and the inner surface of the well borehole 26 to be returned to the mud pit through a mud return line. A filter (not shown) can be used to separate formation cuttings from the drilling mud before the drilling mud is returned to the mud pit. In some embodiments, the drill string 22 has a downhole drill motor 58, such as a mud motor, for rotating the drill bit 42.

In embodiments, the system 10 includes a first module 60 and a second module 62 that are configured to communicate with one another, such as with the first module 60 situated downhole in the well borehole 26 and the second module 62 at the surface. In embodiments, the system 10 includes the first module 60 situated at the distal end of the drill pipe 38 and the drill string 22, and the second module 62 attached to the drill rig 24 at the proximal end of the drill string 22 at the surface. In embodiments, the first module 60 is configured to communicate with the MWD tool 109 (also referred to as a "downhole device" or "downhole tool" herein), such as through a wired connection or wirelessly. In some embodiments, the first module may be included within the MWD tool 109.

The first module 60 includes a downhole processor 64 (e.g., telemetry controller) and a pulser 66, such as a mud pulse valve, communicatively coupled, such as by wire or wirelessly, to the downhole processor 64 (e.g., telemetry controller). The telemetry controller 64 is communicatively coupled to the pulser 66. The pulser 66 is configured to provide a pressure pulse in the fluidic medium in the drill string 22, such as the drilling mud. The MWD tool 109 is communicatively coupled to the MWD data acquisition system 100 and the surface computing device 118.

In some embodiments, the pressure pulse is an acoustic signal and the pulser 66 is configured to provide an acoustic signal that is transmitted to the surface through one or more transmission pathways. These pathways can include the fluidic medium in the drill string 22, the material such as metal that the pipe is made of, and one or more other separate pipes or pieces of the drill string 22, where the acoustic signal can be transmitted through passageways of the separate pipes or through the material of the separate pipes or pieces of the drill string 22. In embodiments, the MWD data acquisition system 100 and/or the surface computing device 118 may include an acoustic signal sensor configured to receive the acoustic signal and communicatively coupled, such as by wire or wirelessly, to the surface processor.

Each of the downhole processor 64 and the surface processor is a computing machine that includes memory (memory device) that stores executable code (computer instructions) that can be executed by the computing machine to perform processes and functions of the system 10. In embodiments, the computing machine is one or more of a computer, a microprocessor, and a micro-controller, or the computing machine includes multiples of a computer, a microprocessor, and/or a micro-controller. In embodiments, the memory is one or more of volatile memory, such as random access memory (RAM), and non-volatile memory, such as flash memory, battery-backed RAM, read only memory (ROM), varieties of programmable read only memory (PROM), and disk storage. Also, in embodiments, each of the first module 60 and the second module 62 includes one or more power supplies for providing power to the module.

Figure 3:
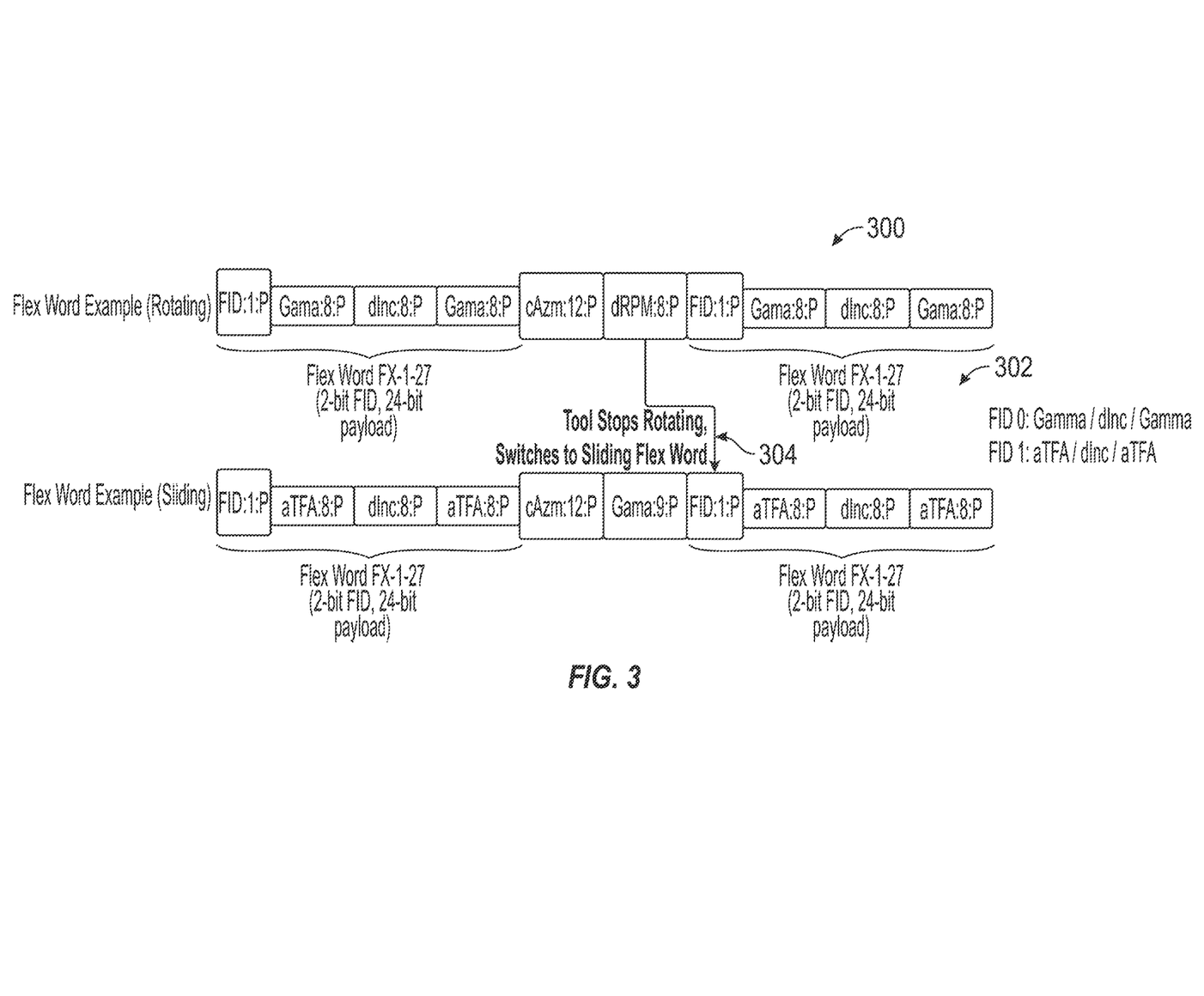
FIG. 3 illustrates a telemetry sequence including two flex words and respective payloads, according to embodiments of the disclosure.

FIG. 3 illustrates a telemetry sequence including two flex words and respective payloads, according to embodiments of the disclosure. A first flex word 300 represents a rotating flex word example, and a second flex word 302 represents a sliding flex word example. Both flex words 300 and 302 include a same number of bits for their payloads in order to maintain synchronization for the telemetry sequence when switching between transmitting the payloads for the rotating flex word 300 and the sliding flex word 302. As depicted, each flex word 300 and 302 includes an FID header packet. The FID includes a flex word identifier which may be any suitable identifier such as a unique value (e.g., 0, 1, 2, 3, 4, 5, 6, etc.), a character, etc. In the depicted example, the rotating flex word includes a 1-bit FID (with parity, for a total of 2-bits) packet (e.g., value of 0 indicating the payload to follow includes rotating related data), a 9-bit gamma packet, a 9-bit inclination packet, and another 9-bit gamma packet. The sliding flex word includes 1-bit FID (with parity, for a total of 2-bits) packet (e.g., value of 1 indicating the payload to follow includes sliding related data), a 9-bit toolface packet, a 9-bit inclination packet, and another 9-bit toolface packet. The surface processor may receive the flex word, read the FID, and determine which data is included in the payload and an order of the packets that follow the FID packet.

Whenever a condition changes downhole, for example, when the tool stops rotating and switching to sliding operating mode, the downhole processor 64 may switch from the rotating flex word 300 to transmitting the sliding flex word 302, for example. As depicted by arrow 304, the downhole processor begins switches from transmitting the rotating flex word 300 to transmitting the sliding flex word during a telemetry sequence without resynchronizing with the surface processor. The downhole processor may transmit the sliding flex word 302 having the FID with a value (e.g., 1) indicating sliding-related data is included in the payload of the sliding flex word 302. In the depicted examples, the flex words include 1-bit FIDs (with parity, for a total of 2-bits) and 27-bit payloads (e.g., 3 packets each having 9-bits). However, as depicted n FIG. 4, there are other sizes that may be selected for the FID packets and/or the payload packets.

Figure 4:
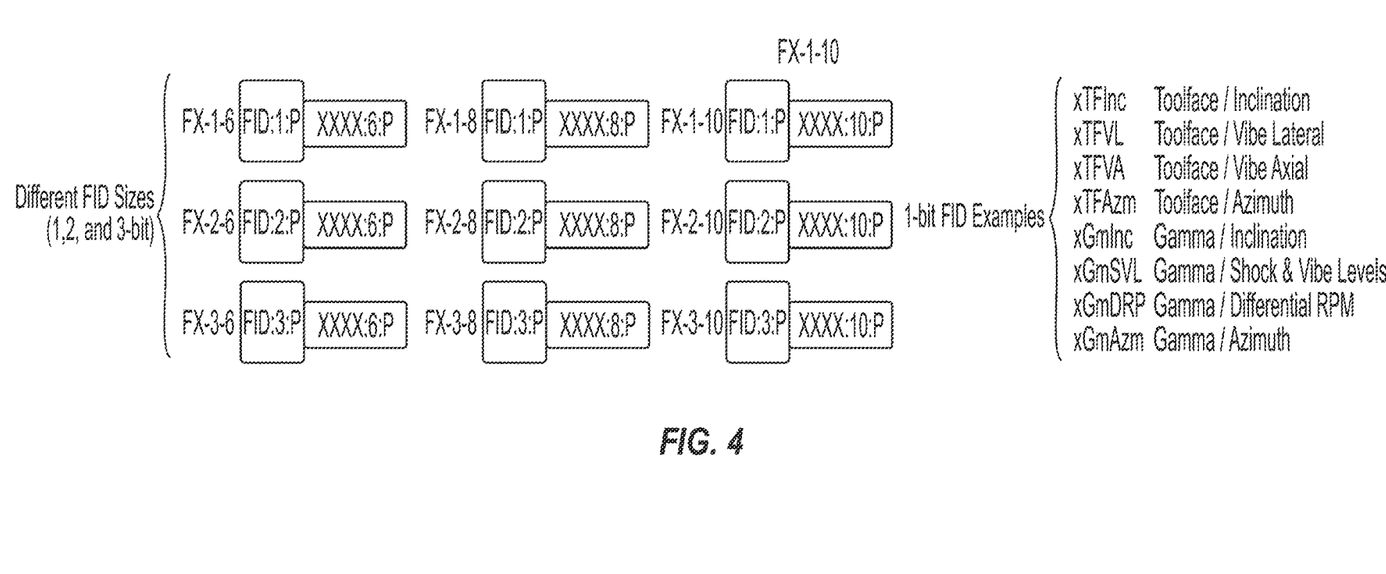
FIG. 4 illustrates different example flex words and payloads, according to embodiments of the disclosure.

FIG. 4 illustrates different example flex words and payloads, according to embodiments of the disclosure. As depicted, different sized FID packets may be used, such as 1, 2, and 3-bit FIDs. The 1-bit FID may be used to represent toolface/inclination, toolface/vibe lateral, toolface/vibe axial, toolface/azimuth, gamma/inclination, gamma/shock and vibe levels, gamma/differential revolutions per minute, and gamma/azimuth. Each of the 1-bit, 2-bit, and 3-bit FID packets may be associated with a payload having 7-bits (e.g., 6 bits of data and a parity bit), 9-bits, and 11-bits, respectively. The sizes of the FIDs and payloads may be selected based on telemetry conditions (e.g., quality of signal, data rate, conditions of the well, etc.). The flex words for different modes (e.g., sliding, rotating, etc.) are the same number of bits for a synchronized telemetry sequence. If the bits differ for the FID and/or payload packets, resynchronization may be performed to enable the surface processor and downhole processor to communicate properly.

In some embodiments, a machine learning model may be trained to select a size of the FIDs and/or payloads based on conditions downhole. For example, if data throughput is slow, smaller sized FIDs and/or payloads may be selected by the trained machine learning model. Training data including downhole conditions, equipment (drill, MWD tool, etc.) conditions, and the like may be labeled as input and output may be labeled that includes the size of the FIDs and/or payloads. Dynamically changing conditions may cause the trained machine learning model to dynamically change the size of the FIDs and/or payloads.

In some embodiments, switching between two payloads for a flex word may include a 1-bit FID. In some embodiments, switching between four payloads may include a 2-bit FID. In some embodiments, the size of the FIDs and payloads may vary depending on the conditions that are detected using sensors downhole. In some embodiments, the size of the FID may depend on how many different payload options are selected for a given flex word.

Figure 5:
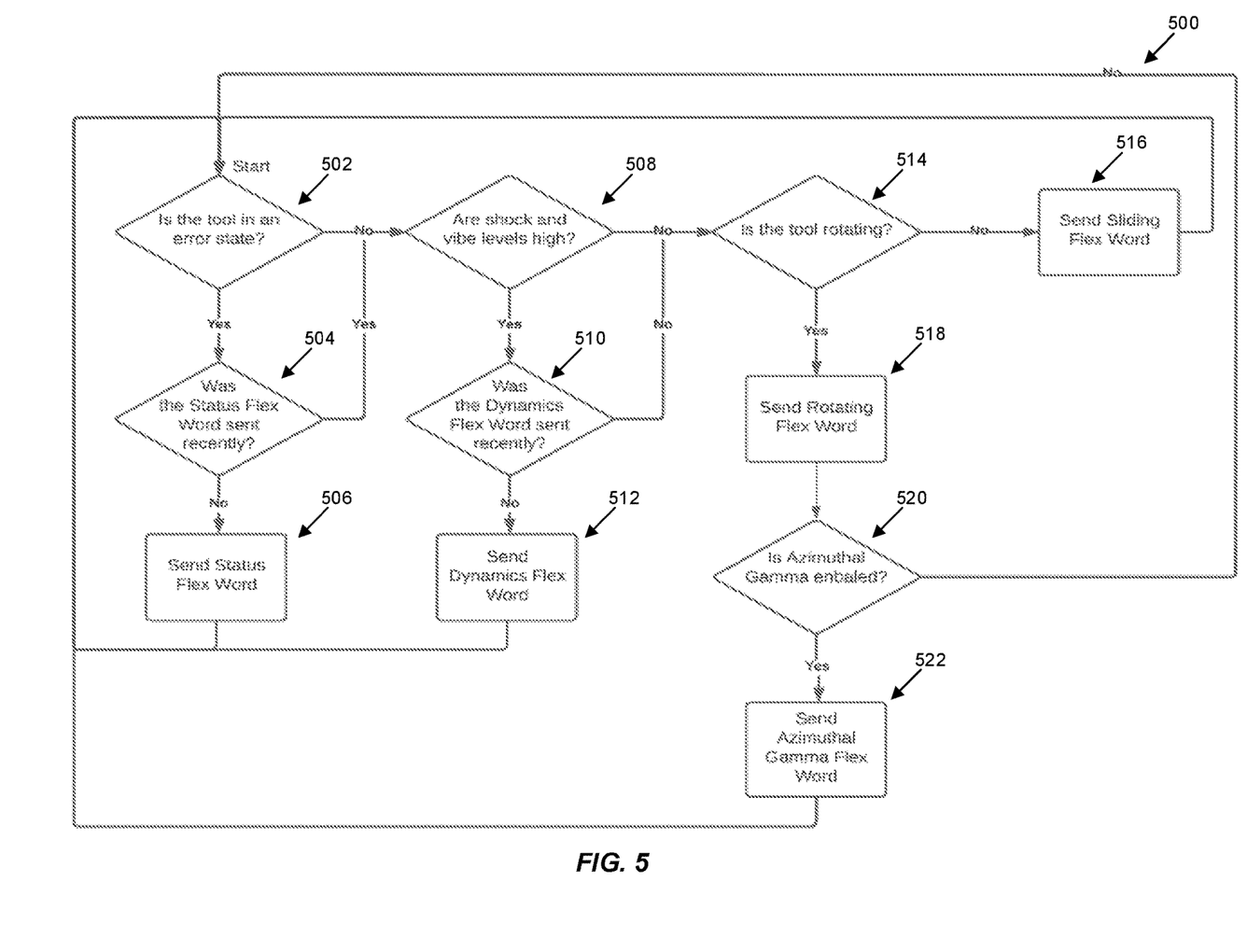
FIG. 5 illustrates a method of determining what flex word to transmit, according to embodiments of the disclosure.

FIG. 5 illustrates a method 500 of determining what flex word to transmit, according to embodiments of the disclosure. The method 500 may be implemented in computer instructions stored on one or more memory devices of the MWD tool 109 and executed by one or more processing devices of the MWD tool 109.

At 502, the downhole processor may determine whether the tool is in an error state. An error state may refer to one or more measurements exceeding a threshold value or being outside of a desired range of values. For example, if vibration measurements are too high (e.g., above a threshold value), a temperature measurement being too high, or the like. Another error state may include part of the tool drill string not operating properly (e.g., drill won't turn on), for example.

At 504, if the tool is in an error state, then the downhole processor may determine if the status flex word was recently sent. The status flex word may include an FID indicating it is a status flex word so that the surface processor knows what type of payload to expect. If the status flex word was not sent recently, the downhole processor transmits the status flex word at 506. If the status flex word was sent recently, the downhole processor determines whether the shock and vibration measurement levels are high at 508. If the shock and vibration measurement levels are high, then the downhole processor may determine if a dynamics flex word was sent recently at 510. If not, then the downhole processor may transmit a dynamics flex word to the surface processor at 512.

If the dynamics flex word was recently sent, then the downhole processor may determine whether the tool is rotating at 514. If the tool is not rotating, then the downhole processor may transmit a sliding flex word at 516. If the tool is rotating, then the downhole processor may transmit a rotating flex word at 518. The downhole processor may then determine whether azimuthal gamma is enabled at 520. If azimuthal gamma is not enabled, the downhole processor may return to 502 to determine whether the tool is in an error state again. If azimuthal gamma is enabled, then the downhole processor may transmit an azimuthal gamma flex word to the surface processor at 522.

It should be noted that continuously transmitting the same flex word to the surface processor may enable the surface processor to not only update data fields associated with that flex word, but also update data fields related to other flex words. In other words, by not receiving a particular flex word (e.g., dynamics flex word) from the downhole processor, the surface processor may determine that the shock and vibration measurement levels are within an acceptable range or threshold and may update data fields associated with shock and vibration measurement levels accordingly. This is enabled because the downhole processor would send the dynamics flex word when the measurement levels are unacceptable. Thus, data communication is streamlined and more efficient using the flex words described herein. Further, processing resources are reduced because not all data associated with all types of measurements is transmitted from the downhole processor to the surface processor. The amount of data transmitted may be reduced such that one flex word may enable updating multiple different data fields related multiple different types of measurements.

Figure 6:
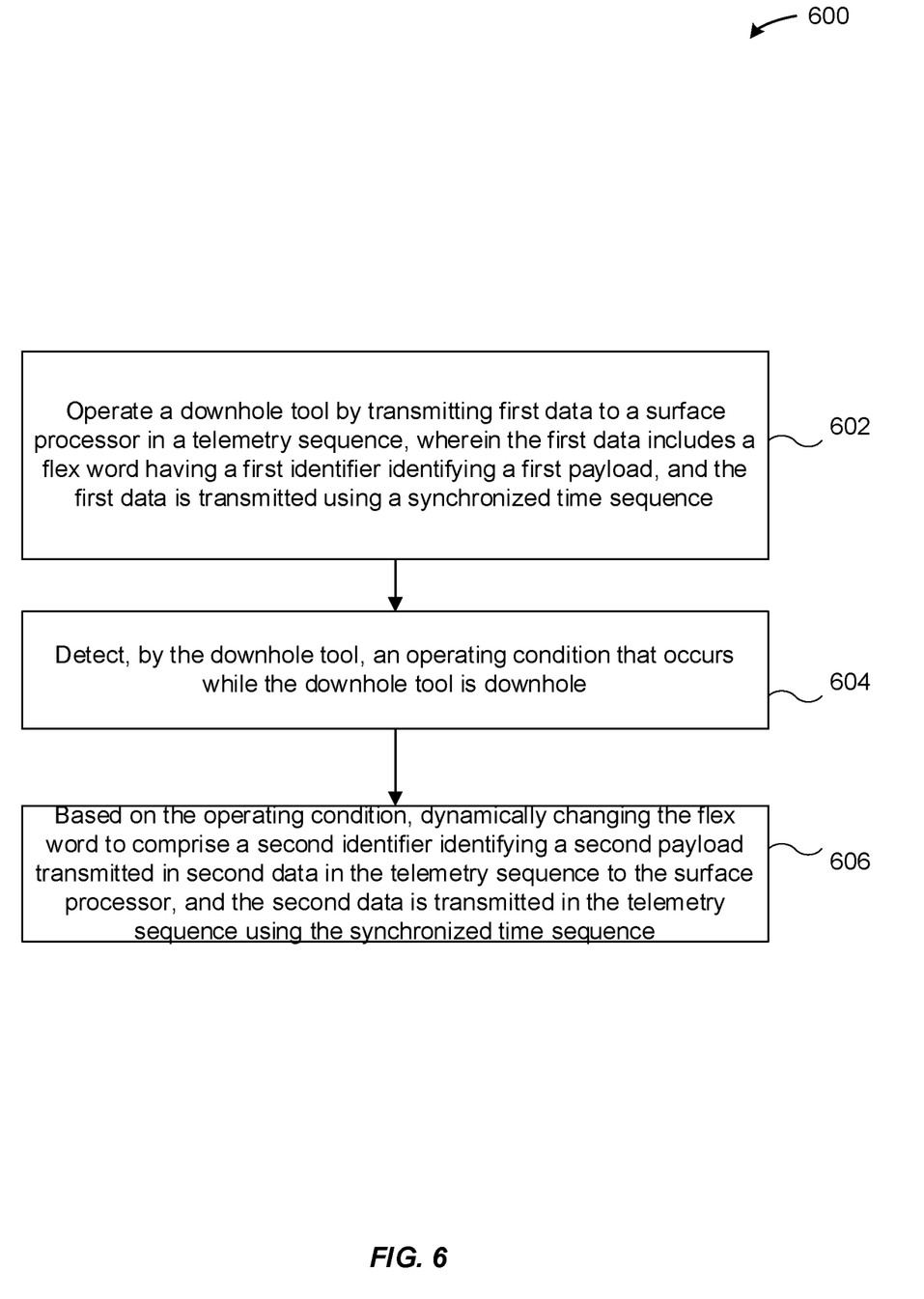
FIG. 6 illustrates a method for dynamically changing an identifier of a flex word and a payload during a telemetry sequence without resynchronizing, according to embodiments of the disclosure.

FIG. 6 illustrates a method 600 for dynamically changing an identifier of a flex word and a payload during a telemetry sequence without resynchronizing, according to embodiments of the disclosure. The method 600 is performed by processing logic that may include hardware (circuitry, dedicated logic, etc.), software (such as is run on a general-purpose computer system or a dedicated machine), or a combination of both. The method 600 and/or each of its individual functions, routines, subroutines, or operations may be performed by one or more processing devices of one or more computing devices (e.g., any component of FIG. 1, such as server 128 executing the artificial intelligence engine 140, surface computing device 118; any component of FIG. 2, such as downhole processor 64, or the like). In certain implementations, the method 600 may be performed by a single processing thread. Alternatively, the method 600 may be performed by two or more processing threads, each thread implementing one or more individual functions, routines, subroutines, or operations of the methods.

For simplicity of explanation, the method 600 is depicted and described as a series of operations. However, operations in accordance with this disclosure can occur in various orders and/or concurrently, and/or with other operations not presented and described herein. For example, the operations depicted in the method 600 may occur in combination with any other operation of any other method disclosed herein. Furthermore, not all illustrated operations may be required to implement the method 600 in accordance with the disclosed subject matter. In addition, those skilled in the art will understand and appreciate that the method 600 could alternatively be represented as a series of interrelated states via a state diagram or events.

At 602, a processing device may operate a downhole tool by transmitting first data to a surface processor in a telemetry sequence. The first data may include a flex word having a first identifier identifying a first payload. The first data may be transmitted using a synchronized time sequence. In some embodiments, the first payload may include data pertaining to a rotating mode of the tool string. In some embodiments, the first payload may include data pertaining to a sliding mode of the tool string. In some embodiments, the first identifier indicates the first payload includes data packets including first measurement types. In some embodiments, the first identifier may indicate to the surface processor a first order of data to be received by the surface processor.

At 604, the processing device may detect an operating condition that occurs while the downhole tool is downhole. The operating condition may be detected based one or more measurements received via one or more sensors of the downhole tool and/or the drill string. The one or more sensors may include an accelerometer, a pressure sensor, a temperature sensor, a strain gauge, a gyroscope, a thermal sensor, a gamma sensor, a radiation sensor, or the like. The operating condition may be detected when the one or more measurements exceed a threshold. Exceeding a threshold may refer to a measurement being below a certain value, equal to a certain value, or above a certain value.

At 606, based on the operating condition, the processing device may dynamically change the flex word to include a second identifier that identifies a second payload transmitted in second data in the telemetry sequence to the surface processor. The second data may be transmitted in the telemetry sequence using the synchronized time sequence. The second data including the flex word having the second identifier may be dynamically changed during the telemetry sequence without the downhole processor and the surface processor resynchronizing. That is, the flex word may be changed to include the second identifier and the second payload dynamically during the telemetry sequence in the same synchronized time sequence.

In some embodiments, the second payload may include data pertaining to a rotating mode of the tool string. In some embodiments, the second payload may include data pertaining to a sliding mode of the tool string. In some embodiments, the second identifier indicates the second payload includes data packets including second measurement types. In some embodiments, at least some of the first measurement types may be different than at least some of the second measurement types. In some embodiments, the second identifier indicates to the surface processor a second order of data to be received by the surface processor.

In some embodiments, the operating condition may include one or more vibration measurements exceeding a threshold and the processing device may alternate between operating in the first data and the second data periodically while the operating condition persists. That is, the downhole processor may dynamically change the identifier of the flex word from the first to second identifier and vice versa periodically and transmit the first payload and the second payload with its corresponding identifier while the operating condition is present. In this way, the surface processor can be updated with both sliding data and rotating data. Such a technique may provide a more thorough and accurate depiction of the downhole conditions, of the downhole tool conditions, and the like.

Figure 7:
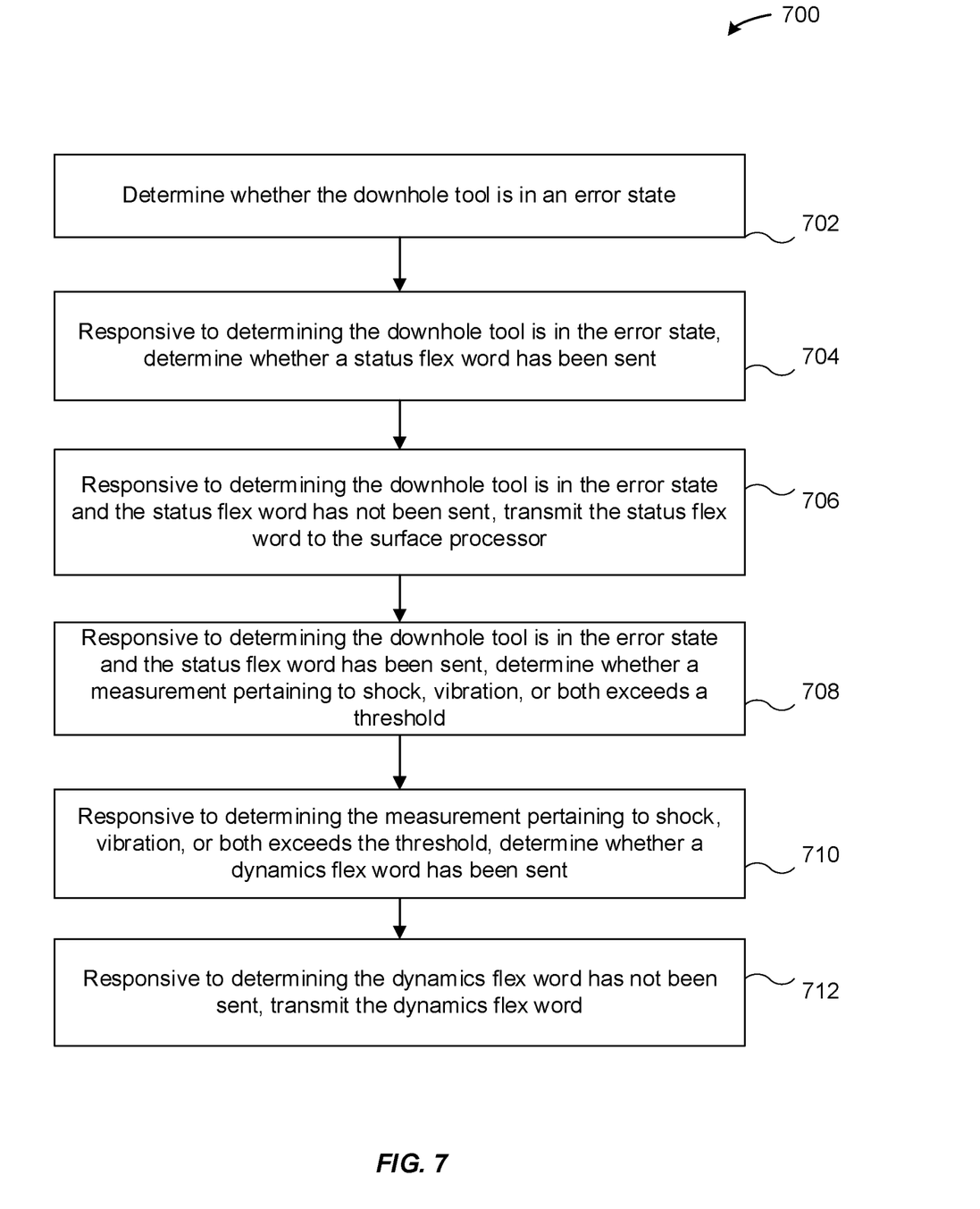
FIG. 7 illustrates another method of determining what flex word to transmit, according to embodiments of the disclosure.

FIG. 7 illustrates another method of determining what flex word to transmit, according to embodiments of the disclosure. The method 700 is performed by processing logic that may include hardware (circuitry, dedicated logic, etc.), software (such as is run on a general-purpose computer system or a dedicated machine), or a combination of both. The method 700 and/or each of its individual functions, routines, subroutines, or operations may be performed by one or more processing devices of one or more computing devices (e.g., any component of FIG. 1, such as server 128 executing the artificial intelligence engine 140, surface computing device 118; any component of FIG. 2, such as surface computing device 118, downhole processor 64, or the like). In certain implementations, the method 700 may be performed by a single processing thread. Alternatively, the method 700 may be performed by two or more processing threads, each thread implementing one or more individual functions, routines, subroutines, or operations of the methods.

For simplicity of explanation, the method 700 is depicted and described as a series of operations. However, operations in accordance with this disclosure can occur in various orders and/or concurrently, and/or with other operations not presented and described herein. For example, the operations depicted in the method 700 may occur in combination with any other operation of any other method disclosed herein. Furthermore, not all illustrated operations may be required to implement the method 700 in accordance with the disclosed subject matter. In addition, those skilled in the art will understand and appreciate that the method 700 could alternatively be represented as a series of interrelated states via a state diagram or events.

At 702, a processing device may determine whether the downhole tool is in an error state. At 704, responsive to determining the downhole tool is in an error state, the processing device may determine whether a status flex word has been sent. At 706, responsive to determining the downhole tool is in the error state and the status flex word has not been sent, the processing device may transmit the status flex word to the surface processor. At 708, responsive to determining the downhole tool is in the error state and the flex word has been sent, the processing device may determine whether a measurement pertaining to shock, vibration, or both exceeds a threshold. At 710, responsive to determining the measurement pertaining to shock, vibration, or both exceeds the threshold, the processing device may determine whether a dynamics flex word has been sent. At 712, responsive to determining the dynamics flex word has not been sent, the processing device may transmit the dynamics flex word.

In some embodiments, the processing device may determine whether the downhole tool is in an error state. Responsive to determining the downhole tool is not in the error state, the processing device may determine whether a measurement pertaining to shock, vibration, or both exceeds a threshold. Responsive to determining the threshold is not exceeded, the processing device may determine whether the downhole tool is rotating. In some embodiments, responsive to determining the downhole tool is not rotating, the processing device may transmit a sliding flex word. In some embodiments, responsive to determining the downhole tool is rotating, the processing device may transmit a rotating flex word. In some embodiments, the processing device may determine whether azimuthal gamma is enabled. Responsive to determining azimuthal gamma is enabled, the processing device may transmit an azimuthal gamma flex word. Responsive to determining azimuthal gamma is not enabled, the processing device may determine whether the tool is in the error state again.

Figure 8:
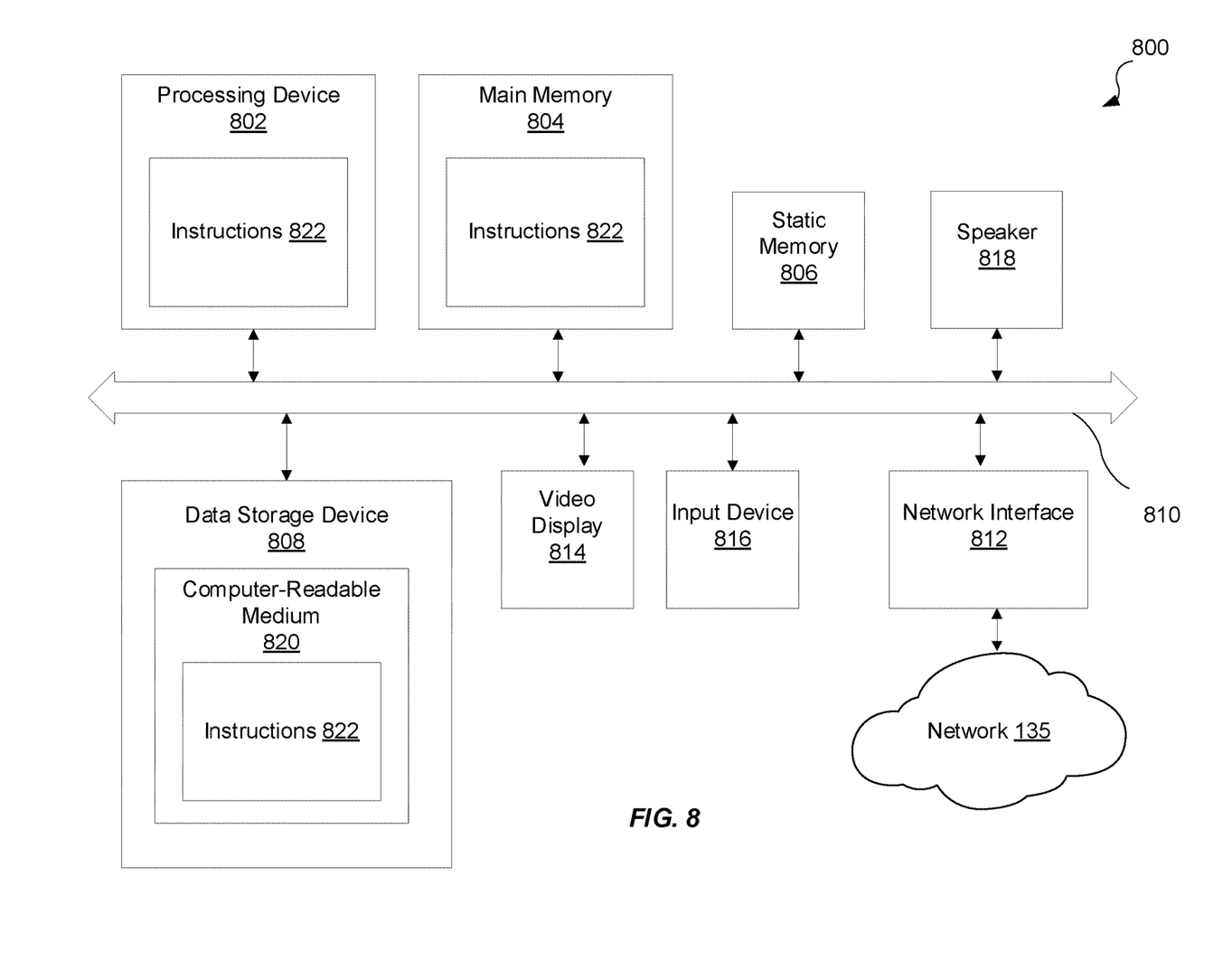
FIG. 8 illustrates an example computer system according to the present disclosure.

FIG. 8 shows an example computer system 800 which can perform any one or more of the methods described herein, in accordance with one or more aspects of the present disclosure. In one example, computer system 800 may correspond to the surface computing device 118 (e.g., user computing device), one or more servers 128 of the cloud-based computing system 116, the training engine 130, the MWD data acquisition system 100, the MWD tool 109, or any suitable component of FIG. 1. The computer system 800 may be capable of executing an application that presents any of the user interfaces described herein, training the one or more machine learning models 132, and/or executing the one or more machine learning models 132 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a wearable (e.g., wristband), a set-top box (S"1'13), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 800 includes a processing device 802, a main memory 804 (e.g., read-only memory (ROM), flash memory, solid state drives (SSDs), dynamic random access memory (DRAM) such as synchronous DRAM (SDRAM)), a static memory 806 (e.g., flash memory, solid state drives (SSDs), static random access memory (SRAM)), and a data storage device 808, which communicate with each other via a bus 810.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a system on a chip, a field programmable gate array (FPGA), a digital signal processor (DSP), network processor, or the like. The processing device 802 is configured to execute instructions for performing any of the operations and steps discussed herein.

The computer system 800 may further include a network interface device 812. The computer system 800 also may include a video display 814 (e.g., a liquid crystal display (LCD), a light-emitting diode (LED), an organic light-emitting diode (OLED), a quantum LED, a cathode ray tube (CRT), a shadow mask CRT, an aperture grille CRT, a monochrome CRT), one or more input devices 816 (e.g., a keyboard and/or a mouse), and one or more speakers 818 (e.g., a speaker). In one illustrative example, the video display 814 and the input device(s) 816 may be combined into a single component or device (e.g., an LCD touch screen).

The data storage device 816 may include a computer-readable medium 820 on which the instructions 822 embodying any one or more of the methods, operations, or functions described herein is stored. The instructions 822 may also reside, completely or at least partially, within the main memory 804 and/or within the processing device 802 during execution thereof by the computer system 800. As such, the main memory 804 and the processing device 802 also constitute computer-readable media. The instructions 822 may further be transmitted or received over a network 135 via the network interface device 812.

While the computer-readable storage medium 820 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Consistent with the above disclosure, the examples of systems and method enumerated in the following clauses are specifically contemplated and are intended as a non-limiting set of examples.

CLAUSES

1. A computer-implemented method comprising:
   operating a downhole tool by transmitting first data to a surface processor in a telemetry sequence, wherein the first data includes a flex word having a first identifier identifying a first payload, and the first data is transmitted using a synchronized time sequence;
   detecting, by the downhole tool, an operating condition that occurs while the downhole tool is downhole; and
   based on the operating condition, dynamically changing the flex word to comprise a second identifier identifying a second payload transmitted in second data in the telemetry sequence to the surface processor, and the second data is transmitted in the telemetry sequence using the synchronized time sequence.

2. The computer-implemented method of any clause herein, wherein the operating condition comprises one or more vibration measurements exceeding a threshold, and the method further comprises:
   alternating between transmitting the first data and the second data periodically while the operating condition persists.

3. The computer-implemented method of any clause herein, wherein the first payload comprises data pertaining to a rotating mode and the second data comprises data pertaining to a sliding mode.

4. The computer-implemented method of any clause herein, wherein:
   the first identifier indicates the first payload comprises data packets including first measurement types, and
   the second identifier indicates the second payload comprises data packets including second measurement types, wherein the first and second measurement types are different.

5. The computer-implemented method of any clause herein, wherein:
   the first identifier indicates to the surface processor a first order of data to be received by the surface processor; and
   the second identifier indicates to the surface processor a second order of data to be received by the surface processor.

6. The computer-implemented method of any clause herein, further comprising:
   determining whether the downhole tool is in an error state;
   responsive to determining the downhole tool is in the error state, determining whether a status flex word has been sent; and
   responsive to determining the downhole tool is in the error state and the status flex word has not been sent, transmit the status flex word to the surface processor.

7. The computer-implemented method of any clause herein, further comprising:
   responsive to determining the downhole tool is in the error state and the status flex word has been sent, determining whether a measurement pertaining to shock, vibration, or both exceeds a threshold;
   responsive to determining the measurement pertaining to shock, vibration, or both exceeds the threshold, determining whether a dynamics flex word has been sent; and
   responsive to determining the dynamics flex word has not been sent, transmit the dynamics flex word.

8. The computer-implemented method of any clause herein, further comprising:
   determining whether the downhole tool is in an error state;
   responsive to determining the downhole tool is not in the error state, determining whether a measurement pertaining to shock, vibration, or both exceeds a threshold;
   responsive to determining the threshold is not exceeded, determining whether the downhole tool is rotating.

9. The computer-implemented method of any clause herein, further comprising responsive to determining the downhole tool is rotating, transmitting a rotating flex word.

10. The computer-implemented method of any clause herein, further comprising:
    determining whether azimuthal gamma is enabled;
    responsive to determining azimuthal gamma is enabled, transmitting an azimuthal gamma flex word; and
    responsive to determining azimuthal gamma is not enabled, determining whether the tool is in the error state.

11. The computer-implemented method of any clause herein, further comprising responsive to determining the downhole tool is not rotating, transmitting a sliding flex word.

12. The computer-implemented method of any clause herein, wherein the first data and the second data comprise a same number of bits.

13. The computer-implemented method of any clause herein, further comprising, based on the surface processor receiving the first data, causing the surface processor to update a data field for data not included in the first data.

14. A system including a tool drill string having a downhole device, the system comprising:
  a memory device storing instructions;
  a downhole processor communicatively coupled to the memory device, wherein the downhole processor executes the instructions to:
  operate the downhole device by transmitting first data to a surface processor in a telemetry sequence, wherein the first data includes a flex word having a first identifier identifying a first payload, and the first data is transmitted using a synchronized time sequence;
  detect, by the downhole device, an operating condition that occurs while the downhole tool is downhole; and
  based on the operating condition, dynamically change the flex word to comprise a second identifier identifying a second payload transmitted in second data in the telemetry sequence to the surface processor, and the second data is transmitted in the telemetry sequence using the synchronized time sequence.

15. The system of any clause herein, wherein the operating condition comprises one or more vibration measurements exceeding a threshold, and the downhole processor is further to:
  alternating between operating in the second and first mode periodically while the operating condition persists.

16. The system of any clause herein, wherein the first payload comprises data pertaining to a rotating mode and the second data comprises data pertaining to a sliding mode.

17. The system of any clause herein, wherein:
  the first identifier indicates the first payload comprises data packets including first measurement types, and
  the second identifier indicates the second payload comprises data packets including second measurement types, wherein the first and second measurement types are different.

18. The system of any clause herein, wherein:
  the first identifier indicates to the surface processor a first order of data to be received by the surface processor; and
  the second identifier indicates to the surface processor a second order of data to be received by the surface processor.

19. A tangible, non-transitory computer-readable medium storing instructions that, when executed, cause a processing device to:
  operate a downhole device by transmitting first data to a surface processor in a telemetry sequence, wherein the first data includes a flex word having a first identifier identifying a first payload, and the first data is transmitted using a synchronized time sequence;
  detect, by the downhole device, an operating condition that occurs while the downhole tool is downhole; and
  based on the operating condition, dynamically change the flex word to comprise a second identifier identifying a second payload transmitted in second data in the telemetry sequence to the surface processor, and the second data is transmitted in the telemetry sequence using the synchronized time sequence.

20. The computer-readable medium of any clause herein, wherein the operating condition comprises one or more vibration measurements exceeding a threshold, and the processing device is further to:
  alternate between operating in the second and first mode periodically while the operating condition persists.

What is claimed is:

1. A computer-implemented method comprising:
  operating a downhole tool by transmitting first data to one or more surface processors in a telemetry sequence, wherein the first data includes a flex word having a first identifier identifying a first payload, and the first data is transmitted using a synchronized time sequence;
  detecting, by the downhole tool, an operating condition that occurs while the downhole tool is downhole; and
  based on the operating condition, dynamically changing the flex word to comprise a second identifier identifying a second payload transmitted in second data in the telemetry sequence to the one or more surface processors, and the second data is transmitted in the telemetry sequence using the synchronized time sequence.

2. The computer-implemented method of claim 1, wherein the operating condition comprises one or more vibration measurements exceeding a threshold, and the method further comprises:
  alternating between transmitting the first data and the second data periodically while the operating condition persists.

3. The computer-implemented method of claim 1, wherein the first payload comprises data pertaining to a rotating mode and the second data comprises data pertaining to a sliding mode.

4. The computer-implemented method of claim 1, wherein:
  the first identifier indicates the first payload comprises data packets including first measurement types, and
  the second identifier indicates the second payload comprises data packets including second measurement types, wherein the first and second measurement types are different.

5. The computer-implemented method of claim 1, wherein:
  the first identifier indicates to the one or more surface processors a first order of data to be received by the one or more surface processors; and
  the second identifier indicates to the one or more surface processors a second order of data to be received by the one or more surface processors.

6. The computer-implemented method of claim 1, further comprising:
  determining whether the downhole tool is in an error state;
  responsive to determining the downhole tool is in the error state, determining whether a status flex word has been sent; and
  responsive to determining the downhole tool is in the error state and the status flex word has not been sent, transmit the status flex word to the one or more surface processors.

7. The computer-implemented method of claim 6, further comprising:
  responsive to determining the downhole tool is in the error state and the status flex word has been sent, determining whether a measurement pertaining to shock, vibration, or both exceeds a threshold;

responsive to determining the measurement pertaining to shock, vibration, or both exceeds the threshold, determining whether a dynamics flex word has been sent; and responsive to determining the dynamics flex word has not been sent, transmit the dynamics flex word.

8. The computer-implemented method of claim 1, further comprising:

determining whether the downhole tool is in an error state;

responsive to determining the downhole tool is not in the error state, determining whether a measurement pertaining to shock, vibration, or both exceeds a threshold;

responsive to determining the threshold is not exceeded, determining whether the downhole tool is rotating.

9. The computer-implemented method of claim 8, further comprising responsive to determining the downhole tool is rotating, transmitting a rotating flex word.

10. The computer-implemented method of claim 9, further comprising:

determining whether azimuthal gamma is enabled;

responsive to determining azimuthal gamma is enabled, transmitting an azimuthal gamma flex word; and responsive to determining azimuthal gamma is not enabled, determining whether the tool is in the error state.

11. The computer-implemented method of claim 8, further comprising responsive to determining the downhole tool is not rotating, transmitting a sliding flex word.

12. The computer-implemented method of claim 1, wherein the first data and the second data comprise a same number of bits.

13. The computer-implemented method of claim 1, further comprising, based on the one or more surface processors receiving the first data, causing the one or more surface processors to update a data field for data not included in the first data.

14. A system including a tool drill string having a downhole device, the system comprising:

one or more memory devices storing instructions;

one or more downhole processors communicatively coupled to the one or more memory devices, wherein the one or more downhole processors execute the instructions to:

operate the downhole device by transmitting first data to one or more surface processors in a telemetry sequence, wherein the first data includes a flex word having a first identifier identifying a first payload, and the first data is transmitted using a synchronized time sequence;

detect, by the downhole device, an operating condition that occurs while the downhole tool is downhole; and based on the operating condition, dynamically change the flex word to comprise a second identifier identifying a second payload transmitted in second data in the telemetry sequence to the one or more surface processors, and the second data is transmitted in the telemetry sequence using the synchronized time sequence.

15. The system of claim 14, wherein the operating condition comprises one or more vibration measurements exceeding a threshold, and the one or more downhole processors are further to:

alternate between operating in a second mode and a first mode periodically while the operating condition persists.

16. The system of claim 14, wherein the first payload comprises data pertaining to a rotating mode and the second data comprises data pertaining to a sliding mode.

17. The system of claim 14, wherein:

the first identifier indicates the first payload comprises data packets including first measurement types, and the second identifier indicates the second payload comprises data packets including second measurement types, wherein the first and second measurement types are different.

18. The system of claim 14, wherein:

the first identifier indicates to the one or more surface processors a first order of data to be received by the one or more surface processors; and the second identifier indicates to the one or more surface processors a second order of data to be received by the one or more surface processors.

19. One or more tangible, non-transitory computer-readable media storing instructions that, when executed, cause one or more processing devices to:

operate a downhole device by transmitting first data to one or more surface processors in a telemetry sequence, wherein the first data includes a flex word having a first identifier identifying a first payload, and the first data is transmitted using a synchronized time sequence;

detect, by the downhole device, an operating condition that occurs while the downhole tool is downhole; and based on the operating condition, dynamically change the flex word to comprise a second identifier identifying a second payload transmitted in second data in the telemetry sequence to the one or more surface processors, and the second data is transmitted in the telemetry sequence using the synchronized time sequence.

20. The one or more tangible, non-transitory computer-readable media of claim 19, wherein the operating condition comprises one or more vibration measurements exceeding a threshold, and the one or more processing devices are further to:

alternate between operating in a second mode and a first mode periodically while the operating condition persists.

* * * * *